United States Patent
Hurtta et al.

(10) Patent No.: US 7,782,818 B2
(45) Date of Patent: Aug. 24, 2010

(54) SYSTEM AND METHOD FOR PROVIDING A CONNECTION IN A COMMUNICATION NETWORK

(75) Inventors: Tuija Hurtta, Espoo (FI); Serge Haumont, Helsinki (FI)

(73) Assignee: Nokia Corporation (FI)

( * ) Notice: Subject to any disclaimer, the term of this patent is extended or adjusted under 35 U.S.C. 154(b) by 2128 days.

(21) Appl. No.: 10/296,050

(22) PCT Filed: Jan. 19, 2001

(86) PCT No.: PCT/EP01/00615

§ 371 (c)(1),
(2), (4) Date: Jul. 3, 2003

(87) PCT Pub. No.: WO01/91370

PCT Pub. Date: Nov. 29, 2001

(65) Prior Publication Data

US 2004/0017798 A1  Jan. 29, 2004

(30) Foreign Application Priority Data

May 22, 2000 (EP) .................. PCT/EP00/04647

(51) Int. Cl.
*H04W 4/00* (2009.01)
*H04B 7/216* (2006.01)
*H04L 12/66* (2006.01)

(52) U.S. Cl. .................. 370/331; 370/335; 370/342; 370/356

(58) Field of Classification Search .................. None
See application file for complete search history.

(56) References Cited

U.S. PATENT DOCUMENTS 5,260,987 A  11/1993  Mauger (Continued)

FOREIGN PATENT DOCUMENTS

EP  0 817 444 A2  1/1998

(Continued)

OTHER PUBLICATIONS

XP-002161729, "*TR 23.913 Turbo-Charger Technical Report Version 1.0.0*" Dec. 13-15, 1999, pp. 6-18.

*Primary Examiner*—Melanie Jagannathan
(74) *Attorney, Agent, or Firm*—Mintz Levin Cohn Ferris Glovsky and Popeo, P.C.

(57) ABSTRACT

The invention proposes a system and method for providing a connection in a communication network which comprises several network elements and is adapted to route a connection via a first network element such as a radio network controller and one or more of alternatively selectable second network elements such as serving nodes. The network comprises a network element which stores a list of selectable second network elements. The list is accessed using an identifier identifying a routing or location area or a desired second network element. The list can be stored in a DNS server which returns to an inquiring network element such as a radio network controller, e.g. IP addresses of serving nodes capable of serving a routing or location area of a connection originating or terminating network element. The connection originating or terminating network element may also be adapted to send an identifier identifying a specific network element such as an SGSN to which it desires to be connected.

45 Claims, 9 Drawing Sheets

U.S. PATENT DOCUMENTS

| | | | |
|---|---|---|---|
| 6,138,017 A * | 10/2000 | Price et al. | 455/433 |
| 6,411,966 B1 * | 6/2002 | Kwan et al. | 707/201 |
| 6,466,556 B1 * | 10/2002 | Boudreaux | 370/331 |
| 6,466,964 B1 * | 10/2002 | Leung et al. | 709/202 |
| 6,603,969 B1 * | 8/2003 | Vuoristo et al. | 455/433 |
| 6,904,028 B1 * | 6/2005 | Semper | 370/331 |

FOREIGN PATENT DOCUMENTS

| | | |
|---|---|---|
| WO | WO 98/26559 | 6/1998 |
| WO | WO 00/21319 | 4/2000 |
| WO | WO 00/28713 | 5/2000 |

* cited by examiner

| SGSN | IP ADDRESS OF SGSN | SGSN NAME (SGSN IDENTIFIER) | ROUTING AREA |
|---|---|---|---|
| SGSN1 | 1.2.3.4 | 2G_SGSN IDENTIFIER_13 | RA1 |
| SGSN2 | 1.2.3.5 | 3G_SGSN IDENTIFIER_14 | RA1 |
| SGSN3 | 1.2.3.6 | 2G_SGSN IDENTIFIER_15 | RA1 |
| SGSN4 | 1.2.3.7 | 3G_SGSN IDENTIFIER_16 | RA1 |
| SGSN1 | 1.2.3.4 | 2G_SGSN IDENTIFIER_13 | RA2 |
| SGSN2 | 1.2.3.5 | 3G_SGSN IDENTIFIER_14 | RA2 |
| SGSN3 | 1.2.3.6 | 2G_SGSN IDENTIFIER_15 | RA2 |
| SGSN5 | 1.2.3.8 | 3G_SGSN IDENTIFIER_16 | RA2 |
| . | . | . | . |
| . | . | . | . |
| . | . | . | . |

Fig. 5

SYSTEM AND METHOD FOR PROVIDING A CONNECTION IN A COMMUNICATION NETWORK

FIELD OF THE INVENTION

The present invention relates to a system and method for providing a connection in a communication network. The communication network may be a pure data network, a network for transmitting data and/or other type of information such as speech or may be a network exclusively reserved for non-data information. The network can be a circuit-switched network, a packet-switched network such as a GPRS or UMTS network, or may consist of a combination of networks of different type.

BACKGROUND OF THE INVENTION

When providing a connection in a communication network, usually several network elements are involved, including the connection originating network element, the connection terminating network element and/or one or more intermediate network elements such as a base station, a base transceiver station, a base station controller and/or one or more support nodes handling the signalling and/or user traffic.

As an example, in a GPRS-based or UMTS-based network, a connection (e.g. call) originating from, or terminating at, a user equipment such as a mobile station (MS) is made to a connection terminating or originating equipment using a radio network controller (RNC) which communicates with a SGSN (Serving GPRS Support Node) and possibly a GGSN (Gateway GPRS Support Node). The connection terminating or originating equipment can be located in the same or a different network. In particular, in case of mobile user equipments, the actual location thereof network. In particular, in case of mobile user equipments, the actual location thereof is defined with a resolution of a routing area (e.g. in idle state) or with a finer resolution of a cell (e.g. when handling a connection such as a call). Note that Routing area (RA) is a standard term used in conjunction with GPRS, while GSM and UMTS Circuit Switched systems use the term Location Area (LA). In both case, the area is referring to the area where a mobile station is registered in the serving node (e.g. SGSN or MSC/VLR), and where eventually the serving node pages the mobile station to establish downlink connection. In this application, the term area will be used to refer to location area and/or routing area.

The coverage area of an entire network is usually divided in several areas (RA or LA), with one area (in a GPRS- or UMTS-based network) being assigned to one serving node (one serving node typically handling many areas). When having information on the area where the user equipment is presently located, the serving node in charge of handling a connection to or from this user equipment is unambiguously defined.

For example, in GSM and UMTS, this one to one correlation between the routing or location areas and the assigned SGSNs may, however, be of disadvantage in case of breakdown of an SGSN or necessary maintenance operations such as software updating. In such a case, the routing area has to be completely shut-down and is at least temporarily no longer usable for providing connections.

This situation may be significantly improved when changing the network structure in such a manner that at least two serving nodes such as two SGSNs are able to handle the same routing area. In such a case, e.g. a base station controller (BSC) or radio network controller (RNC) may use different interfaces such as Iu and/or Gb. Several types of mobile stations may be supported by using two radio interfaces and providing only one single base transceiver station (BTS).

The provision of two or more support nodes serving the same routing area provides several advantages such as resilience by enabling an RNC (possibly having a list of available SGSNs) to use another SGSN if the previously used SGSN should become overloaded or out of order. Furthermore, maintenance operations such as software updates can be effected without shutting down the area. In addition, the network signalling caused by inter-SGSN hand-over can be reduced.

As an example, several SGSNs may be provided for covering a metropolitan area such as London area, and a mobile station moving around the city can always use its original SGSN for handling connections.

For instance, an IP network may be introduced on an interface such as Iu interface which presently is mainly used as a point-to-point Iu interface between the RNC and the SGSN. When introducing an IP network or network of some other appropriate type on the Iu interface, one RNC may be connected to several SGSNs.

In a case where one network element (which e.g. is in charge of controlling the radio connection to a user equipment) is able to connect to different support nodes being alternatively provided, there exists a problem in finding and selecting an appropriate support node, for instance an SGSN to be used for a signalling connection. This signalling connection may e.g. be used to transfer L3 (layer 3) messages (such as mobility management MM and session management SM) between the user equipment (e.g. MS) and the support nodes such as SGSN. Furthermore, in case of inter-support node hand-over the new support node would benefit from finding the old support node which was serving the user equipment until hand-over.

SUMMARY OF THE INVENTION

The present invention provides a solution for solving or at least relieving the above problems either partly or entirely.

According to one aspect, the invention is a system which may be a whole network, may be only a part of a network, or may comprise two or more networks.

The invention additionally provides, according to a further aspect, one or more network elements equipped so as to implement the hardware structure or functions usable in a network or connection or selection method.

The present invention provides a solution for allowing a first network element such as a radio network controller or base station controller to decide which support node (e.g. SGSN) to use for a connection (e.g. signalling connection or user traffic connection). A signalling connection is provided for transferring messages such as L3 messages, e.g. MM and SM, between a network element such as a user equipment, e.g. MS, and the support node. Hence, the first network element may be alternatively connected to different support nodes serving e.g. the same routing area. Such an implementation provides the advantages mentioned above.

The invention is also providing, in case of hand-over of a connection between different support nodes such as SGSNs, a structure and method enabling the new support node to find the old support node serving the user equipment up to now.

In accordance with the invention, an area identifier such as "Routing Area Identity (RAI)" may be used by the first network element (e.g. RNC) to derive a list of alternatively selectable second network elements such as support nodes. In this list different support nodes are identified by their addresses. This list may be preconfigured inside the RNC. According to another embodiment, the first network element may send a message or request containing the identifier (e.g. RAI) to another network element such as a DNS (Domain Name System) server in order to receive, as a response, a list of possible second network elements serving the routing area indicated by the RAI. This avoids the need of preconfigured list, and DNS is particularly suitable if the list of possible second network elements contains IP addresses.

The another network element preferably contains, or co-operates with, a memory storing the list (table) of possible second network elements, and may send this list as a rolling or distributed list to spread the load. The list may for instance be sent in form of several parts, each part indicating only one or two (or more) selectable second network elements. The list may be ranked in a defined order, for instance based on the address of the first network element sending the list request or indicating first a default second network element for this area. The ranking may be such that the first of the second network elements indicated in the list is always the closest one to the first network element, the second of the listed second network elements being the second closest one to the first network element, etc.

The order of listing of the second network elements in the list may also, in an embodiment, be based on information on the actual or previous load of each listed second network element. As an alternative, the order of listing of the second network elements may be kept unchanged, but additional information is attached to the list indicating the actual or previous load condition of the listed second network elements. In the latter case, the first network element checks the load condition information as well, and selects one of the second network elements having the smallest load or at least being one of the lighter-loaded second network elements.

The modification of the order of the listing of the second network elements taking account of the load, or the attachment of the load information to the list, is preferably performed by the operation and maintenance system (O&M) provided for the network.

According to one possible implementation of the invention, a second network element for which a maintenance operation such as software updating is planned, may be withdrawn from the list (to be sent to an inquiring first network element) some time such as a few hours before the software update. In such a way, one can ensure that no or at least not many connections or contexts will still be handled by this second network element.

According to one possible implementation of the invention, if a second network element is not responding, another second network element may be selected from the list.

According to one possible implementation, the identifier such as CN (Core Network) Identifier may be added to a message, e.g. RRC (Radio Resource Control) message which is used to initiate a connection and/or carry a message such as a L3 message (e.g. Attached Request, Routing Area Update Request or Service Request). The first network element (e.g. RNC) checks the identifier (e.g. CN Identifier) from the RRC message. In addition, the first network element may also deduce the area identifier such as RAI from the cell where the user equipment is actually located. The combination of area identifier and CN Identifier identifies unambiguously the serving node. The first network element derives the serving node address from a list. In one embodiment, the first network element uses the area identifier and/or the CN identifier to request the list-transmitting network element such as a DNS server to send a list of second network elements assigned to the transmitted identifier.

Certain systems, such as GSM or UMTS systems have different types of serving nodes (e.g. SGSN and MSC/VLR) serving the same area. In the UMTS system, the RRC signalling contains a parameter (CN domain identity) identifying the CN type. In GSM, the CN type is identified implicitly from the type of channel established.

In such systems, the indication of CN type in addition to the combination of area identifier and CN Identifier may be needed to identify unambiguously the serving node.

According to one possible implementation of the invention, one of the second network elements may be set as a default second network element serving the routing area in which the connection terminating or originating equipment such as MS is presently located. The first network element is configured to use this default second network element for handling a connection as long as no other second network element is selected (i.e. CN identifier is not sent by the MS).

In accordance with an embodiment of the invention, the selection of one of the available second network elements covering a certain routing area may be performed in dependence on information coming from another network element such as a user equipment, for instance a mobile station. If the user equipment wants to establish a connection, e.g. a signalling connection, to a certain support node (second network element) which for instance had previously handled the connection to and from this user equipment, the user equipment preferably sends additional information such as CN identifier to e.g. the first network element which may be a RNC. As an example, the user equipment had established a signalling connection to a certain support node, e.g. SGSN, whereafter the signalling connection had been released, and the user equipment wants to establish the signalling connection again to the same support node.

In accordance with one aspect of the invention, the user equipment may then add an identifier information such as CN identifier to a message which, e.g., may be used to carry an L3 message (e.g. a Routing Area Update Request or Service Request). If the MS moves to a new area which cannot be handled by the previous serving node in which it is registered, RNC selects a new serving node, and the new serving node derives the old serving node address by using the combination of CN identifier (added according to this embodiment to Routing Area Update Request) and old RAI (sent in Routing Area Update Request in GSM and UMTS). In addition, or as an alternative, the first network element (e.g. RNC) may check the information CN identifier from the L3 message.

The new serving node should send its CN identifier in e.g. Routing Area Update accept, or attach accept to the MS.

The invention furthermore provides a possibility of finding and selecting an old support node (e.g. old SGSN) by a new support node, in particular after inter-node hand-over. Note that in a structure in which the old SGSN can be found with the old RAI (when only one SGSN serves a specific routing area designated by RAI), there is no problem in finding the old SGSN. However, in a situation where a routing area is covered by several support nodes in parallel, it will be advantageous if the new support node is able to detect the old support node in order to e.g. copy context information for handling the connection such as PDP (Packet Data Protocol) context information.

According to one aspect of the invention, the network element storing the list of second network elements (i.e. support nodes) covering a certain area such as RA (Routing Area) or LA (Location Area) may additionally store, for each support node, an CN identifier identifying this support node. This identifier may be sent as a new Information Element (i.e. it is sent explicitly) or may be coded as part of another Information Element such as a temporary identity (i.e. it is sent implicitly). As an example of sending the CN identifier implicitly, CN identifier may be formed by some bits (e.g. 4 last bits) of PTMSI (Packet Temporary Mobile Station Identity).

The network element storing the list of second network elements available for the respective areas (e.g. RA or LA) can be a DNS server, and preferably stores the list of support nodes mapped to the respective area indicators such as RAIs (Routing Area Identities) or LAIs (Location Area Identities). This network element may return, in response to an area indicator sent to it, not only the IP addresses of every support node (second network element) assigned to the respective area (e.g. RAI), but additionally also the network element identifiers assigned to these support nodes, and eventually the type of support node. The network element in charge of selecting the second network element for handling the connection (e.g. signalling connection) may then select that second network element which has an network element identifier corresponding to the network element identifier transmitted e.g. from the user equipment as selection criterion.

As an alternative, the network element storing the list may be queried with both CN identifier and area identifier, so that only the address of the right support node is returned.

The type of support node may be used e.g. in a network comporting both 2G and 3G SGSN. In this case, a RNC (3G only) may only select a support node indicated as a 3G support node, based on the type of support node indicated.

The second network element may preferably maintain state information about the user equipment (e.g. location, subscriber data, etc.). The state information allows to keep the connection to the same serving node, e.g. same SGSN. Without state information, the user equipment might change the serving node, e.g. SGSN, at every connection.

The connection is preferably maintained in the same selectable second network elements when the MS is moving inside the CN area.

In order to avoid processing problems, according to one aspect of the invention, one of the second network elements (e.g. SGSN) available for a routing area may be a master network element which, if not handling itself the context information such as PDP context, may act as a relay, and may determine the old second network element based on e.g. the identifier sent for instance from the user equipment together with PTMSI. In such a case, the identifier may have been sent from the old support node to the user equipment together with PTMSI during (e.g. at the begin or end) of the time period during which it was in charge for handling the connection to the user equipment. The user equipment hence knows the supporting network element such as the support node which handled its connections. This embodiment may be particularly applicable if the SGSN where the MS moved was not upgraded to find the appropriate old (i.e. previous) SGSN.

The second network elements may also be MSCs (Mobile Switching Centres) or other types of serving elements, e.g. in circuit-switched networks.

The solutions provided by the present invention are furthermore applicable in a case where network elements of different generation (such as 2G SGSN and a 3G SGSN) are provided which handle the connections for the same routing area. The selection of the support node may be made depending on the type of the connection established and/or requested, or on the type of the user equipment. As an example, the invention may be employed in a GERAN system (GSM/EDGE radio access network).

The present invention allows an effective adaptation of a cellular network being at least partly IP-based. IP networks are essentially peer-to-peer structured whereas the conventional cellular networks such as GSM, UMTS, etc. are typically based on an hierarchical architecture wherein a radio access network (RAN) or, in more detail, a controller controlling the radio access such as a RNC, RNS, BTS, BSS and the like, is handled by a single serving node (e.g. MSC/VLR; SGSN; . . . ).

The invention is a structure and method wherein one network element providing e.g. radio access (e.g. RAN) to a user equipment is connected to many serving nodes such as core network (CN) nodes. This reduces the number of inter-CN-node-area update procedures and increases the reliability. The invention is a new architecture for a cellular system wherein one radio access network (or the is network element providing or controlling the radio access) as well as a location area (LA) or routing area (RA) can be handled by many serving nodes of the same type. A routing function for deciding to which serving node the connection is to be made, is preferably located in the radio access network (RAN) or the respective network element providing or controlling the radio access, and is not located between the radio access network and the serving node, or in the serving node. The routing function located in the RAN additionally provides or comprises a method for selection of the serving node to connect to.

Furthermore, the method and system according to the invention may be used to detect the node where a user equipment is actually registered, one of the network elements having a list of serving nodes serving the present location area (or routing area) of the user equipment. Preferably, this list includes a default serving node. The serving node to be used for handling the connection is preferably determined in the following manner: When the user equipment has not sent an identifier such as a core network (CN) identifier, the default serving node, if defined, will be selected from the list. If the user equipment has sent an identifier such as a CN identifier, a serving node corresponding to this identifier will be selected. The default serving node may be defined to be the serving node mentioned on a specific position of the list for the routing or location area, e.g. the first serving node mentioned on the list. When no identifier is sent from the user equipment, the serving node mentioned on the specific place, e.g. the first-mentioned serving node, is selected by the RAN from the list.

This method and structure can be used by the radio access network (or RAN controlling node or component) to find the serving node to be used. Likewise, this method and structure can be used by the new serving node to find the old serving node to which the user equipment was registered, or may be used by the new serving node to find the MSC/VLR to which the user equipment was registered, in particular in a case when the Gs interface is used.

In accordance with one aspect of the invention, a user equipment such as a MS may select a serving node by using a CN identifier. The CN identifier may be the latest used identifier, or may be a preconfigured, i.e. predetermined CN identifier which is stored in the user equipment, e.g. on a SIM card thereof.

Furthermore, the method and system according to the invention may be used to allow many operators (each owning their own serving node) to share a common Radio Access Network (owned by another operator). If every operator uses a different CN identifier, and if the MSs are configured to always use same CN identifier (even in the very first attach request) based on subscription information typically read from a SIM card, then the MS will always be connected to an SGSN owned by this operator (from which they bought SIM card).

BRIEF DESCRIPTION OF THE DRAWINGS

FIG. 5 shows details of a table stored in a DNS server;

DETAILED DESCRIPTION OF PREFERRED EMBODIMENTS OF THE INVENTION

Figure 1:
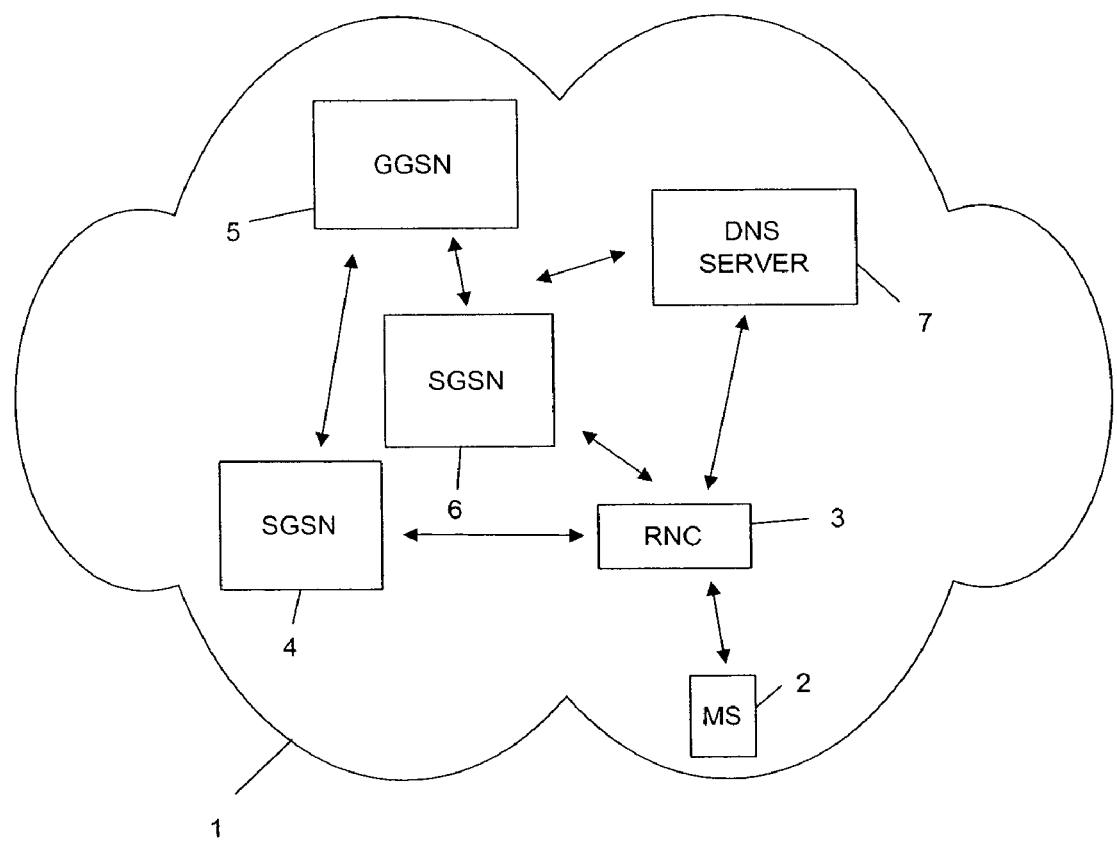
FIG. 1 shows a basic structure of one embodiment of a system in accordance with the invention.

FIG. 1 shows the basic structure of an embodiment of a system in accordance with the invention. The system is implemented as a network 1, or forms a part thereof, which network 1 comprises at least one, or usually a plurality of, user equipments 2 which, in this embodiment, are implemented as mobile stations MS. The user equipments may also be any other type of equipments such as stationary terminals. Although only one user equipment 2 is shown, usually several user equipments are attached to the network 1 and represent connection originating or terminating equipments.

In case of connection, or connection set-up, with another equipment forming part of network 1 or of another network, a radio connection to user equipment 2 is provided and handled by a radio access network (RAN). The RAN comprises, in this embodiment, a radio network controller (RNC) 3 which is part of, or represents, the radio access network for radio connection to user equipment 2. Usually, several radio access networks and controllers 3 will be provided in the network 1 for radio coverage of the different areas of the network 1. The RNC 3 (first network element) may be selectively connected to different serving nodes which, in this embodiment, are implemented as SGSNs 4 and 6.

The network may comprise additional or alternative serving nodes such as mobile switching centers (MSCs) which normally will be combined with visitor location registers (VLRs). The serving nodes 4, 6 may be connected, if necessary, to a gateway node 5 which here is a GGSN and provides the possibility of connection to other networks.

In addition, a DNS (Domain Name System) server 7 is provided which may form part of network 1 or may be a network-external component. The DNS server 7 can be accessed by RNC 3, and usually also by other network components such as serving nodes 4, 6 and/or gateway node 5. The communication possibilities are shown in FIG. 1 as double-headed arrows.

The DNS server 7 comprises, or has access possibility to, a memory (not shown) storing lists (tables) of serving nodes available for alternatively covering routing areas or location areas of the network 1.

FIG. 5 shows an example of a table stored in the memory. According to this example, the table contains several columns and rows. The left column "SGSN" lists the available serving nodes. SGSN1 may correspond to SGSN 4, SGSN2 may correspond to SGSN 6, and SGSN3, SGSN4 may correspond to further serving nodes not shown in FIG. 1 and covering other routing or location areas of the network 1. The table furthermore, contains a column "IP address of SGSN" listing the IP addresses of the individual available serving nodes. The column "SGSN name" or "(SGSN identifier)" lists the identifiers identifying the individual serving nodes. In this example, the type of the node (2G or 3G) is built in the identifier. The column "Routing Area" lists the routing areas or location areas being covered by the individual serving nodes. As an example, the serving nodes SGSN1 SGSN2, SGSN3 and SGSN4 are available for covering the same first routing area RA1 whereas the serving nodes SGSN1 SGSN2, SGSN3 and SGSN5 are available for alternatively covering a second routing area RA2 in which a mobile station may be located, e.g. after moving thereto from routing area RA1.

Depending on the details of implementation of embodiments of the invention, the stored list does not necessarily contain all columns shown in FIG. 5. For instance, the column "SGSN" and/or "Routing area" (if all RAs handled by RNC use same CN identifier, and the list is specific per RNC) may be omitted. Alternatively, the list may also contain additional information useful for selecting an appropriate serving node. For instance, a column "serving node type" and/or a column indicating default nodes for some or all respective areas may be added.

Generally, the architecture of a network or system according to the invention comprises two or more CN (Core Network) nodes of same type (e.g. MSC and/or SGSN) which are connected to the same radio access network or node RAN (e.g. BSS "base station sub-system"; UTRAN "UMTS Terrestrial Radio Access Network"; GERAN "GSM/EDGE Radio Access Network") and assigned to the same location area (LA) and/or routing area (RA). One or more of the provided RANs contain, or are able to download from a network element such as the DNS server 7, a preconfigured list of CN nodes. Preferably, the CN nodes are associated with a CN identifier which is unique at least for the assigned LA/RA.

The system and method according to preferred embodiments of the invention are preferably structured in such a manner that each time when a user equipment registers into one location or routing area (e.g. by performing an Attach or Area Update procedure), the CN node handling the registration returns its CN identifier to the user equipment, e.g. in the MM (Mobility Management) signalling. The user equipment stores a received CN identifier representing the serving node actually handling a connection. Furthermore, the user equipment may be designed to indicate the CN identifier (if known and/or if a re-establishment of the connection to a previously used CN is desired), if desired, when the user equipment establishes a connection to the radio network. The CN identifier may be indicated for instance in the radio signalling, e.g. during RRC connection establishment.

In order to ensure backward compatibility, the new information element (identifier such as CN identifier) is an optional information element transmitted in both MM and RRC signalling (if an explicit information element is used for both protocols). This ensures that user equipments not supporting this feature will nevertheless work with new network elements. As such a user equipment is never sending the CN identifier, it is always connected to a CN node which is set as a default node to be selected when not receiving any CN identifier. Likewise, when the user equipment should move to a RAN not supporting this feature, the RNC is structured to ignore any CN identifier and to establish the connection always with the only CN node it is connected with.

If the CN node does not support this feature, no CN identifier will be returned to the user equipment. The user equipment may be configured to erase previously stored CN identifier, so that next time it is connected to the default node. In such a case, the user equipment is unable to transmit any CN identifier in the next connection request and will thus be connected to the default CN node provided for this area. In all these cases, the result is similar to existing systems.

If one CN node is not supporting this feature, it shall be configured as the default CN node.

When a GSM radio access (connection) is used in a GPRS-based network or other type of packet-based network, the TLLI (Temporary Logical Link Identifier) is sent to the base station controller BSC with every packet transfer. When considering to add a separate CN identifier, a heavy radio load would result as the CN identifier would have to be sent with every packet transfer as well. According to one embodiment of the invention, the CN identifier will be sent implicitly, i.e. encoded within the TLLI. It should be noted that TLLI is always derived from PTMSI, by changing the three first bits. This coding may be effected by coding the temporary identity (PTMSI and TLLI) in a defined way, for instance using the 4 last bits to indicate CN identifier. This solution does neither increase the radio nor the signalling load. When sending a Routing Area Update (RAU) and/or Attach Request message, the user equipment automatically sends the old TLLI. The new PTMSI coded so as to contain the CN identifier of the serving network element serving the connection, is sent back in the RAU/Attach response message on the radio signalling level. Thus, this feature of transmitting a CN identifier can be introduced to a GPRS-based network without changes of the protocols. But it requires the BSC to implement the method described in this invention to select the right SGSN for every packet transfer.

In an UMTS network, the above solution is likewise applicable, but would require the RNC to read the PTMSI sent in L3 MM messages, which are presently only relayed by RNC. Here, however, it is preferred to introduce a new information element (i.e. to send CN identifier explicitly) for identifying the serving node in charge of the connection to the user equipment. In an UMTS network, the RNC keeps the RRC context. Therefore, when including the CN identifier into the RRC context, it is not necessary to send the CN identifier often.

In a GPRS network (both GSM and UMTS), there is an additional problem occurring during an inter-SGSN-Routing Area Update. During such hand-over, the new SGSN needs to find the old SGSN which handled the connection to the user equipment up to now. For instance, PDP (Packet Data Protocol) context information must be transferred from old SGSN to the new SGSN.

In accordance with an embodiment of the invention, the user equipment preferably includes the CN identifier in the RA (Routing Area) Update Request message, and the DNS server 5 returns, upon a respective query from the RNC 3 indicating the old routing area identifier, a list of IP addresses of SGSNs in charge of the routing area. A CN identifier is implicitly or explicitly associated with every IP address, such as shown in FIG. 5. The CN identifier is implicitly indicated if the position on the list indicates the CN identifier. In such a case, it is not necessary to separately transmit the CN (e.g. SGSN) identifier. When, in the list example shown in FIG. 5, the routing area identifier designates the routing area RA 1, a list is returned from DNS server 7 to RNC 3 containing SGSN1 and SGSN2 and indicating the IP addresses thereof.

When explicitly transmitting the CN identifiers, the associated identifiers "2G_SGSN IDENTIFIER_13" and "3G_SGSN IDENTIFIER_14" are transmitted associated with the IP addresses. In particular the Canonical name associated with the IP address is returned from DNS server 7 to RNC 3 which represents the value of the CN identifier. This concept effectively uses the structure of DNS which is based on Canonical name (CNAME) or alias, as defined in e.g. RFC 1034 and 1035. Therefore, as part of the response of the DNS, there is a transmitted a list of IP addresses and Canonical names (CNAME), as indicated in FIG. 5 by the two center columns and the rows associated to the same routing area (e.g. RA1), respectively.

With this feature, the RNC or BSC can easily select the appropriate SGSN on the basis of the technology used by the user equipment and of the SGSN identifier, which can be recognised from e.g. TLLI in GPRS, and extended CN identifier in UMTS, as mentioned above.

When the CN identifier is only implicitly indicated, it is represented by the position on the list. For instance, when not sending the SGSN NAME identifier, the first SGSN is determined as the SGSN to be used for handling the connection of the user equipment in routing area 1, This SGSN thus serves e.g. as a default serving node to be used for connection handling when no CN identifier (SGSN identifier) is indicated.

Otherwise, the SGSN having an assigned CN identifier which corresponds to the CN identifier indicated by user equipment 2, will be selected as SGSN for handling the connection, or for transmitting the context information to the new SGSN. In the latter case of inter-SGSN-handover, the new SGSN can detect the old SGSN on the basis of the CN identifier and the area identifier which identifies the old SGSN and have been transmitted (explicitly or implicitly for CN identifier) from the user equipment in subsequent messages, e.g. together with PTMSI. The RAN or new SGSN can therefore detect e.g. the IP address of the old SGSN when sending a query to the DNS server 7.

Alternatively, a master SGSN may be provided which, when not handling the PDP context itself, acts as a relay and determines the old SGSN based on e.g. CN identifier. The DNS server 7, or alternatively or additionally, the master SGSN may have a list of SGSNs mapped to the RAI (RA1, RA2 in the column "ROUTING AREA" of FIG. 5). In the latter case, it is not necessary to provide the DNS server with such a list of SGSNs mapped to the RAIs.

This information on the old SGSN may be used by the new SGSN for changing all PDP contexts contained in the old SGSN to the new SGSN for a user equipment or even for all user equipments, in particular when intending to perform maintenance operations of the old SGSN such as software-updating.

The list of SGSN addresses and SGSN identifiers may be modified in case of need to use another SGSN to serve one or more SGSN identifiers. Subsequent signalling connections will then be made to this another SGSN when sending these SGSN identifiers. This also requires the updating of GTP tunnels for the existing PDP contexts, etc.

Figure 2:
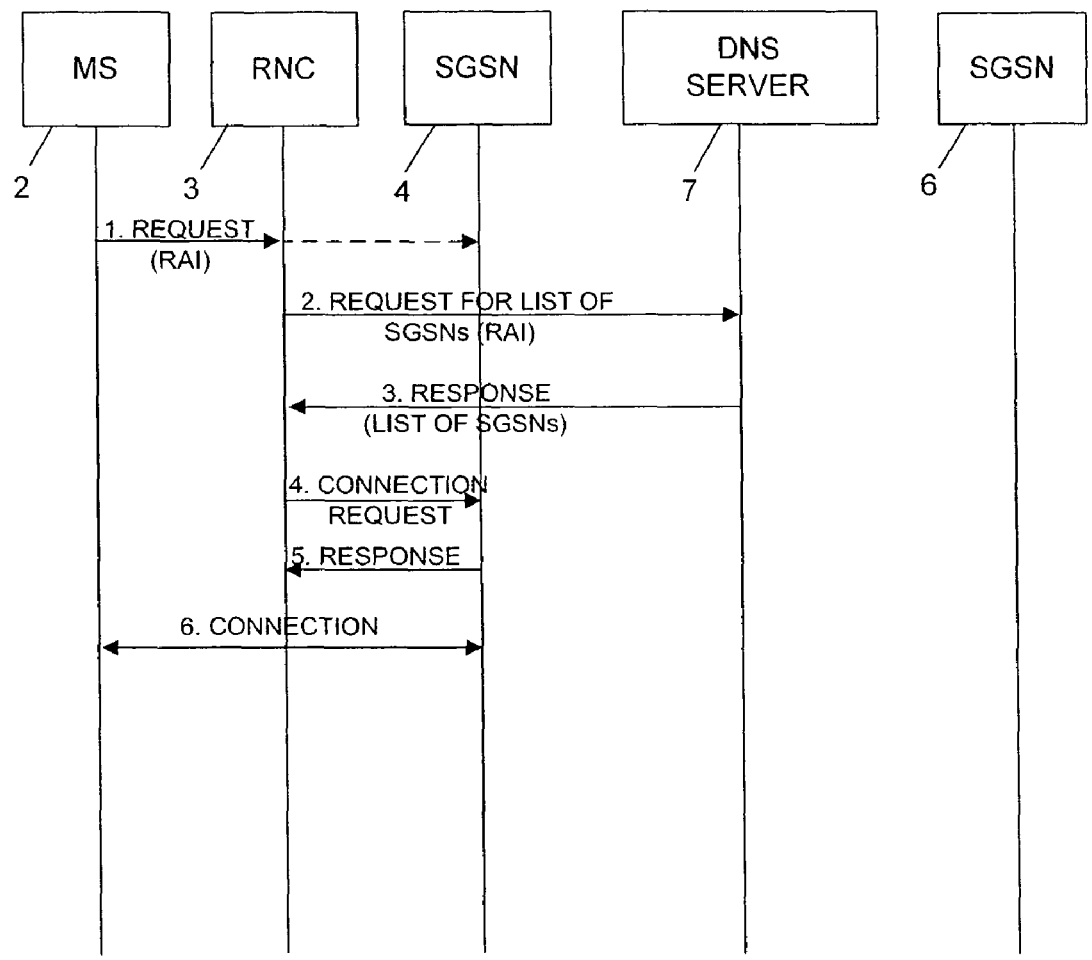
FIG. 2 illustrates the message flow for establishing a connection between a user equipment and a serving node.

FIG. 2 refers to a case, in which the radio access network controller such as RNC 3 used the method to determine which SGSN to use for handling a connection to a user equipment MS 2. In a step 1), MS 2 sends a request, e.g. a RRC connection message, optionally including the CN identifier identifying the serving node in which the MS 2 may be registered. The RNC 3 detects the new RAI directly from the cell where the MS is located. Then the RNC selects the SGN by using a list as depicted in FIG. 5 and the proposed method. This list may be preconfigured in RNC or retrieved from another network element like showed by step 2) and 3).

In a step 2), the RNC sends a request to the DNS server 7 requesting a list of SGSNs available for the routing area. This request indicates the routing area identity RAI. The DNS server 7 checks the table memory containing the SGSN list such as shown in FIG. 5, by selecting only those SGSNs corresponding to the indicated routing area. In a step 3.), the DNS server 7 returns the list of selected SGSNs to the RNC 3.

As an alternative to steps 2.) and 3.), the RNC 3 may also send, in step 2.) additionally, or only, the CN identifier received from MS 2, to the DNS server 7. The DNS server 7 is, in this case, preferably uses the CN identifier for selection of the appropriate SGSN from the list, and returns, in step 3.) merely the IP address of the appropriate SGSN. The RNC 3 will then establish, in steps 4.) to 6.), a connection using this single received IP address of the desired SGSN.

The RNC 3 selects one SGSN according to the following method:

If the CN Id is or was sent in the signalling, the RNC uses the CNid as a key and the area to select the right serving node.

Note that the area does not need to be used in the special case where the area(s) handled by RNC have same configuration (e.g. RNC handles only one RA).

In addition, the RNC may check the type of the serving node. In an UMTS system, an RNC when handling a packet connection, needs to select a serving node of SGSN type (and not MSC/VLR). In addition, if there are different SGSN types (e.g. 2G and 3G), the RNC needs to select an appropriate one, i.e. a 3G SGSN for an RNC.

If the RNC finds a suitable serving node, it will use the serving node address indicated in the list to establish the connection.

If the RNC does not find a suitable node, it could select any serving node of the suitable type supporting this area. This selection may be done randomly to spread the load, based on preferred serving node(s) (e.g. located close to RNC), or based on known information of the respective load of charging nodes (e.g. from operation and maintenance or DNS system) to select the less loaded serving node, or a combination of the above.

If the CN Id is was not sent in the signalling, the RNC could select the serving node according to either of the following embodiments:

In a first preferred embodiment, where all MS are assumed to support sending of CN identifier (e.g. a GPRS system where CN identifier is implicitly coded as part of the TLLI), the RNC could select any serving node of the suitable type supporting this area. This selection may be done randomly to spread the load, based on preferred serving node(s) (e.g. located close to RNC), or based on known information of the respective load of charging nodes (e.g. from operation and maintenance procedures, or DNS system) to select the less loaded serving node, or a combination of the above. If some of the information above is implicitly indicated by the order of the list (e.g. Serving nodes ranked from less loaded to more loaded) the RNC 3 is preferably adapted to select an SGSN indicated at a specific place of the list.

In a second preferred embodiment, where some MS (typically legacy MS) are assumed not to support sending of CN identifier (e.g. first generation UMTS mobiles does not send CN identifier as part of RRC signaling), the RNC has to select a default serving node for this area. This is needed to be sure that next time a connection is established from same mobile (still not indicated by its CN identifier), the same node is selected again. Of course as the default is unique per area, a new serving node may be selected when the area changes (similar to existing behaviour). In addition, when the serving node changes, in system such as GPRS, the new serving node needs to find the old serving node. The new serving node needs to also use the default serving node handling the old area when no CN identifier is sent. This way the address of the old serving node can always be retrieved unambiguously.

The RNC 3 subsequently performs, in the known manner, the necessary steps for establishing the connection between the MS 2 and the selected SGSN 4.

In addition, or as an alternative, the list of SGSNs sent in response 3.) may contain additional information such as load information to be checked by RNC 3 for determining on the SGSN to be selected.)

The connection to the selected SGSN may fail, in this case the RNC may retry with another Serving node of the appropriate type supporting this area.

If the selected SGSN (and the connection fail) was the default SGSN according to the second preferred embodiment, a new SGSN may be selected as the default, typically a secondary default. In this case, when the serving node is changing, the new serving node tries first to connect to the default (as previously). If the default SGSN is down or not knowing the user, the new SGSN retries using the secondary default serving node handling the old area when no CN identifier is sent. This way the address of the old serving node can always be retrieved unambiguously.

When a SGSN is scheduled for operation and maintenance procedures, it preferably is excluded from the list sent back in response to 3.) a certain or determined time interval such as several hours before the scheduled maintenance time point so as to avoid connections to be newly established to this SGSN. In this case, the DNS server 7 is informed by the operation and maintenance system on the SGSN(s) scheduled for maintenance operations, and is either no longer selected such an SGSN from the list, or excludes the same, when having retrieved the available SGSNs from the memory, from transmission to the RNC 3. Therefore, when the SGSN is shut down for operation and maintenance procedures, the number of registered users in this SGSN is at a minimum. These user connections may just be lost, or they may be sent to a new SGSN configured to use for this area the same CN identifier as the SGSN being shut down.

The steps 4.) to 6.) shown in FIG. 2 for establishing the connection between MS 2 and SGSN 4 are the customary ones and are therefore not explained in detail.

Figure 3:
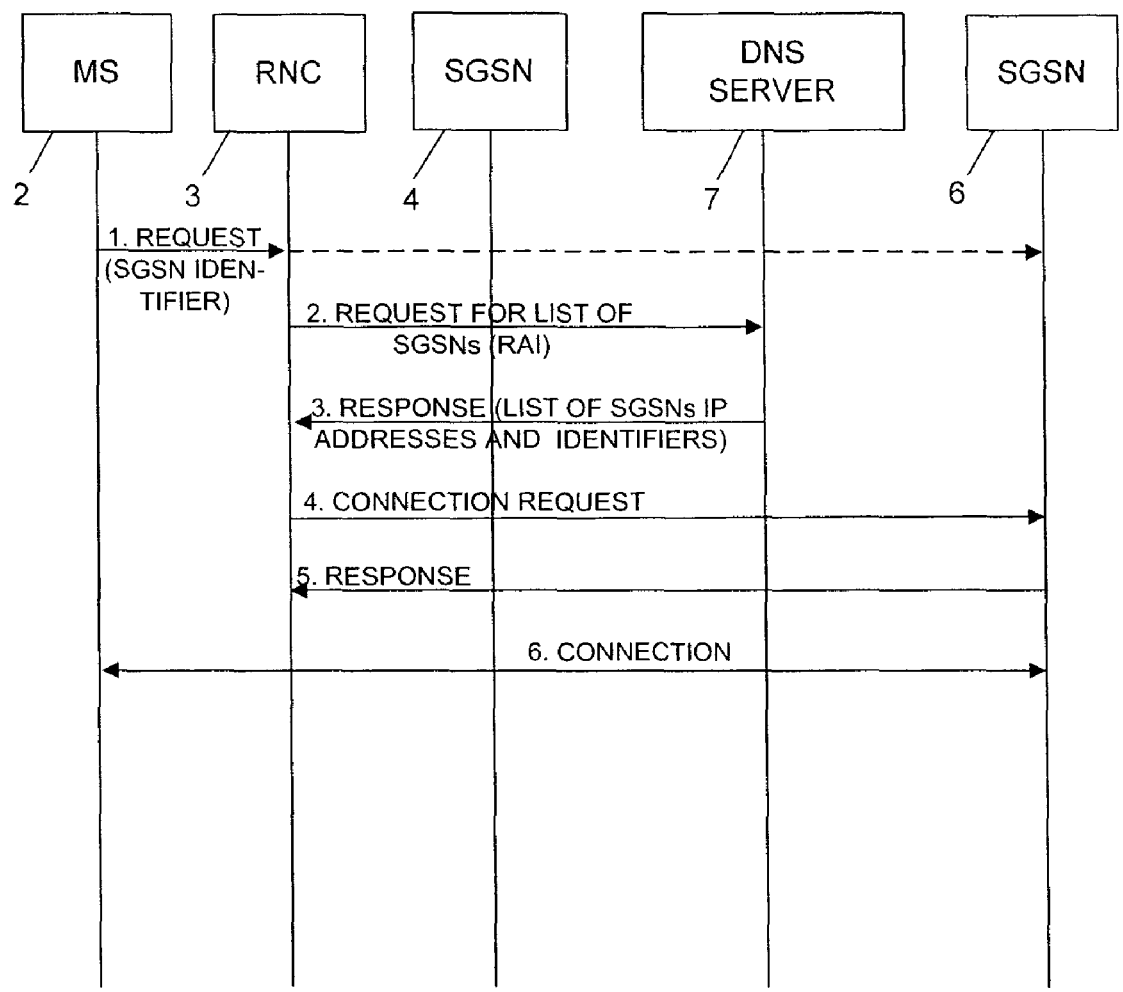
FIG. 3 shows a method for selecting a desired serving node.

FIG. 3 refers to a case where the MS 2 is connected to a certain SGSN 6, e.g. when re-establishing a connection. In this case, the MS 2 sends a request such as a RRC message which includes an SGSN identifier identifying the desired SGSN 6. In the request 1.), the routing area identity (RAI) or location area identity (LAI) can be additionally indicated.

As an alternative, the RNC 3 can deduce the routing (or location) area, and thus the routing (or location) area identity, from other parameters. Similar to step 2.) of FIG. 2, the RNC 3 requests, in a step 2.) of FIG. 3, the DNS server 7 to send back a list of SGSNs by indicating location position such as RAI as a selection criterion. The DNS server 7 retrieves from the serving node list such as shown in FIG. 5 a sub-list of IP addresses and identifiers of SGSNs corresponding to, and being able to serve, the indicated location area. The DNS server 7 returns this sub-list to RNC 3 a response in step 3.). The RNC 3 selects that SGSN (here: SGSN 6) from the sub-list received in step 3.) which corresponds to the SGSN identifier indicated by MS 2 in step 1.), and performs the known connection steps 4.) to 6) for establishing the connection between MS 2 and the desired SGSN 6.

As an alternative to steps 2.) and 3.), the RNC 3 may also send, in step 2.) additionally, or only, the SGSN identifier received from MS 2, to the DNS server 7. The DNS server 7 is, in this case, preferably uses the SGSN identifier for selection of the appropriate SGSN from the list, and returns, in step 3.) merely the IP address of the appropriate SGSN. The RNC 3 then establishes, in steps 4.) to 6.), a connection using this single received IP address of the desired SGSN.

Figure 4:
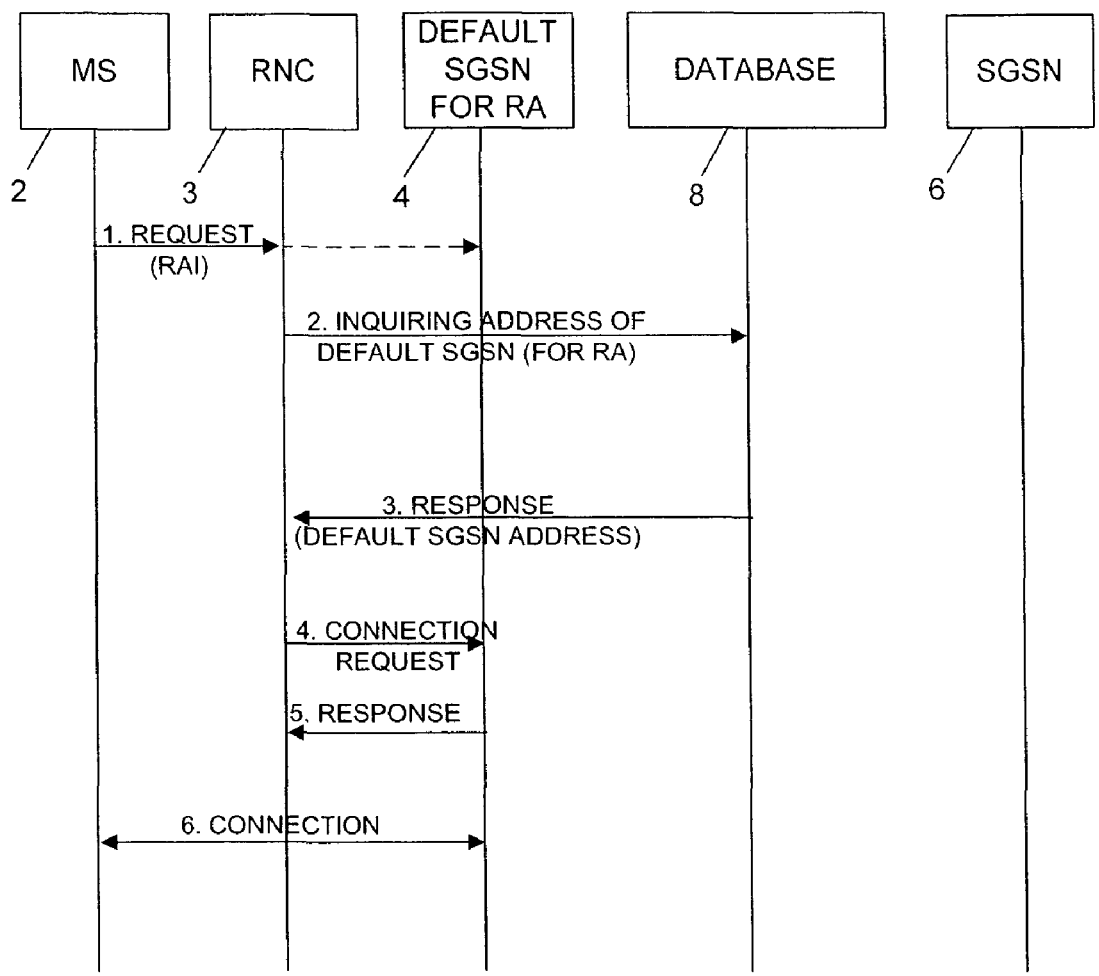
FIG. 4 illustrates a message flow in a system and method according to a further embodiment of the invention.

FIG. 4 shows an alternative or additional function of the same or another embodiment of the method and system in accordance with the invention. According to FIG. 4, one of the SGSNs, here the SGSN 4, is set as a default SGSN for a specific routing area RA. Similar to step 1.) of FIGS. 2 and 3, the step 1.) of FIG. 4 sends a message such as a RRC connection request, from MS 2 to RNC 3, indicating the routing area identifier RAI. The RNC 3 recognizes from the lack of any SGSN identifier requesting a connection to a specific SGSN, the possibility of selecting the default SGSN for the indicated routing area. The RNC 3 then inquires, in step 2.) a database 8 for returning the address of the default SGSN 4, and indicates the routing area identity in the inquiring message. The database 8 may be structured similar to the table shown in FIG. 5 and may be contained in, or accessible by, a DNS server 7, or another server. The database 8 returns, in response 3.), the address of the default SGSN which address is used by RNC 3 in the customary manner for establishing a connection between MS 2 and the default SGSN 4, as represented by steps 4.) to 6.).

Figure 6:
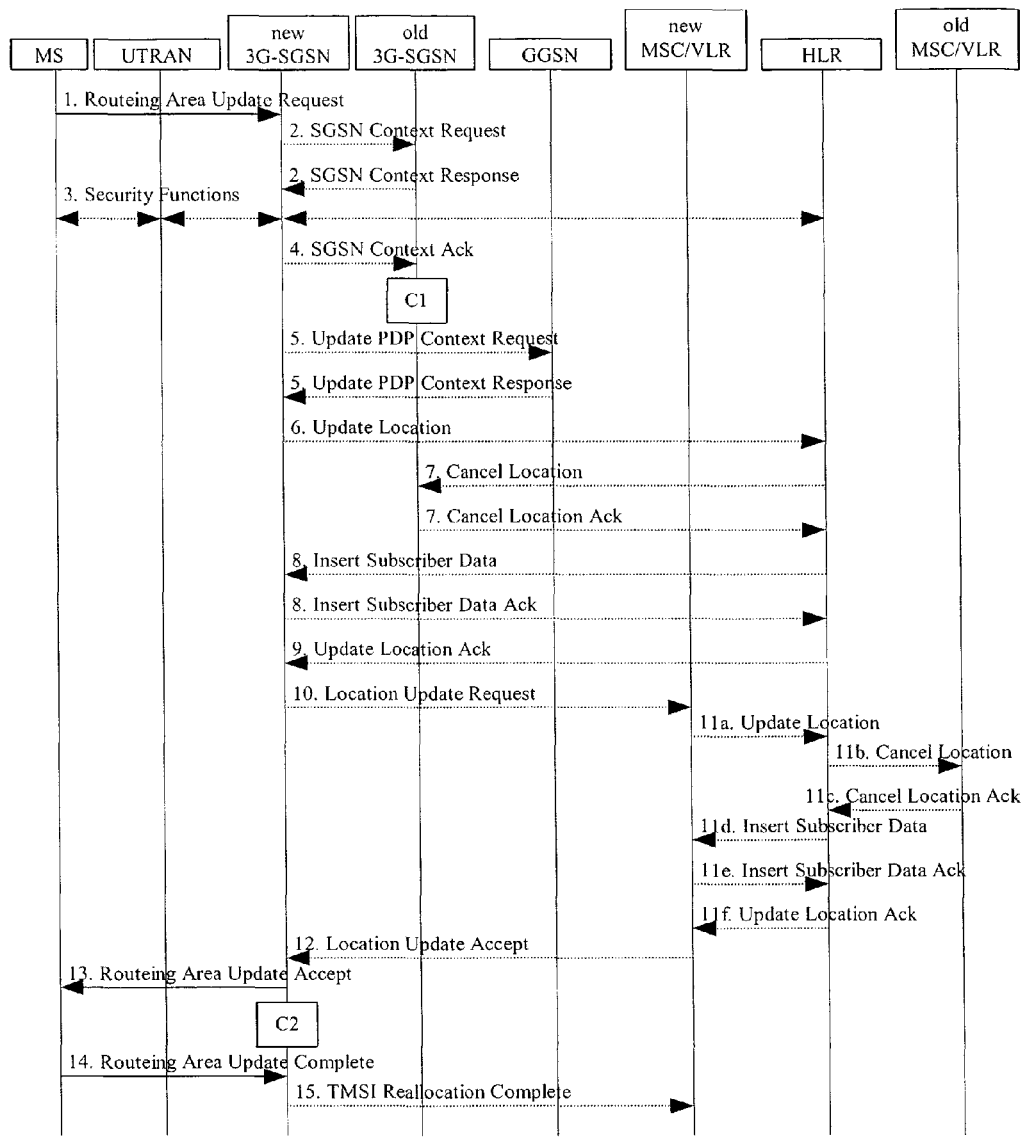
FIG. 6 illustrates the method steps performed in a Routing Area Update Procedure according to an embodiment of the invention related to UMTS.

FIG. 6 shows the steps of a Routing Area Update Procedure in a preferred implementation of the invention, related to UMTS. Some of the modifications of this embodiment, as compared to the specifications, are emphasized by using bold letters.

A routing area update takes place when an attached MS detects that it has entered a new RA or when the periodic RA update timer has expired. The SGSN detects that it is an intra SGSN routing area update by noticing that it also handles the old RA. In this case, the SGSN has the necessary information about the MS and there is no need to inform the GGSNs or the HLR about the new MS location. A periodic RA update is always an intra SGSN routing area update. If the network operates in mode I, then an MS that is both GPRS-attached and IMSI-attached shall perform the Combined RA/LA Update procedures. In UMTS, an RA update is either intra-SGSN or inter-SGSN RA update, either combined RA/LA update or only RA update, either initiated by an MS in PMM-CONNECTED or in PMM-IDLE state. All the RA update cases are contained in the procedure illustrated in FIG. 6.

The steps shown in FIG. 6 for performing a UMTS RA Update Procedure will be described using the step numbering of FIG. 6.

1) The RRC connection is established, if not already done. The MS sends a Routing Area Update Request message (P-TMSI, old RAI, old P-TMSI Signature, Update Type, follow on request, CN identifier) to the new SGSN using on the radio interface an RRC message (Initial direct transfer or uplink direct transfer) including the CN identifier if stored in the MS. Th CN identifier and the old RAI is used by the new SGSN to find the old SGSN. A follow on request shall be set by MS if there is pending uplink traffic (signalling or user data). The SGSN may use, as an implementation option, the follow on request indication to release or keep the Iu connection after the completion of the RA update procedure. Update Type shall indicate:

RA Update if the RA Update is triggered by a change of RA;

Periodic RA Update if the RA update is triggered by the expiry of the Periodic RA Update timer;

Combined RA/LA Update if the MS is also IMSI-attached and the LA update shall be performed in network operation mode I (see subclause "Interactions Between SGSN and MSC/VLR"); or Combined RA/LA Update with IMSI attach requested if the MS wants to perform an IMSI attach in network operation mode I.

The SRNC shall add the Routing Area Identity including the RAC and LAC of the area where the MS is located before forwarding the message to the 3G-SGSN. This RA identity corresponds to the RAI in the MM system information sent by the SRNC to the MS.

NOTE: Sending the Routing Area Update Request message to the SGSN triggers the establishment of a signalling connection between UTRAN and SGSN for the concerned MS.

2) If the RA update is an Inter-SGSN Routing area update and if the MS was in PMM-IDLE state, the new SGSN sends SGSN Context Request message (old P-TMSI, old RAI, old P-TMSI Signature) to the old SGSN to get the MM and PDP contexts for the MS. The old SGSN validates the old P-TMSI Signature and responds with an appropriate error cause if it does not match the value stored in the old SGSN. This should initiate the security functions in the new SGSN. If the security functions authenticate the MS correctly, the new SGSN shall send an SGSN Context Request (IMSI, old RAI, MS Validated) message to the old SGSN. MS Validated indicates that the new SGSN has authenticated the MS. If the old P-TMSI Signature was valid or if the new SGSN indicates that it has authenticated the MS, the old SGSN responds with SGSN Context Response (Cause, IMSI, MM Context, PDP contexts). If the MS is not known in the old SGSN, the old SGSN responds with an appropriate error cause. The old SGSN starts a timer.

3) Security functions may be executed. These procedures are defined in subclause "Security Function". If the security functions do not authenticate the MS correctly, then the routing area update shall be rejected, and the new SGSN shall send a reject indication to the old SGSN. The old SGSN shall continue as if the SGSN Context Request was never received.

4) If the RA update is an Inter-SGSN Routing area update, the new SGSN sends an SGSN Context Acknowledge message to the old SGSN. The old SGSN marks in its context that the MSC/VLR association and the information in the GGSNs and the HLR are invalid. This triggers the MSC/VLR, the GGSNs, and the HLR to be updated if the MS initiates a routing area update procedure back to the old SGSN before completing the ongoing routing area update procedure.

5) If the RA update is an Inter-SGSN RA Update and if the MS was in PMM-IDLE state, the new SGSN sends Update PDP Context Request (new SGSN Address, QoS Negotiated, Tunnel Endpoint Identifier,) to the GGSNs concerned. The GGSNs update their PDP context fields and return an Update PDP Context Response (Tunnel Endpoint Identifier). Note: If the RA update is an Inter-SGSN routing area update initiated by an MS in PMM-CONNECTED state, then the Update PDP Context Request message is sent as described in the specification subclause "Serving RNS Relocation Procedures".

6) If the RA update is an Inter-SGSN RA Update, the new SGSN informs the HLR of the change of SGSN by sending Update Location (SGSN Number, SGSN Address, IMSI) to the HLR.
7) If the RA update is an Inter-SGSN RA Update, the HLR sends Cancel Location (IMSI, Cancellation Type) to the old SGSN with Cancellation Type set to Update Procedure. If the timer described in step 2 is not running, then the old SGSN removes the MM context. Otherwise, the contexts are removed only when the timer expires. It also ensures that the MM context is kept in the old SGSN in case the MS initiates another inter SGSN routing area update before completing the ongoing routing area update to the new SGSN. The old SGSN acknowledges with Cancel Location Ack (IMSI).
8) If the RA update is an Inter-SGSN RA Update, the HLR sends Insert Subscriber Data (IMSI, subscription data) to the new SGSN. The new SGSN validates the MS's presence in the (new) RA. If due to regional subscription restrictions the MS is not allowed to be attached in the RA, the SGSN rejects the Routing Area Update Request with an appropriate cause, and may return an Insert Subscriber Data Ack (IMSI, SGSN Area Restricted) message to the HLR. If all checks are successful then the SGSN constructs an MM context for the MS and returns an Insert Subscriber Data Ack (IMSI) message to the HLR.
9) If the RA update is an Inter-SGSN RA Update, the HLR acknowledges the Update Location by sending Update Location Ack (IMSI) to the new SGSN.
10) If Update Type indicates combined RA/LA update with IMSI attach requested, or if the LA changed with the routing area update, then the association has to be established, and the new SGSN sends a Location Update Request (new LAI, IMSI, SGSN Number, Location Update Type) to the VLR. Location Update Type shall indicate IMSI attach if Update Type in step 1 indicated combined RA/LA update with ISI attach requested. Otherwise, Location Update Type shall indicate normal location update. The VLR number is translated from the RAI via a table in the SGSN. The SGSN starts the location update procedure towards the new MSC/VLR upon receipt of the first Insert Subscriber Data message from the HLR in step 8). The VLR creates or updates the association with the SGSN by storing SGSN Number.
11) If the subscriber data in the VLR is marked as not confirmed by the HLR, the new VLR informs the HLR. The HLR cancels the old VLR and inserts subscriber data in the new VLR (this signalling is not modified from existing GSM signalling and is included here for illustrative purposes):
    a) The new VLR sends an Update Location (new VLR) to the HLR.
    b) The HLR cancels the data in the old VLR by sending Cancel Location (IMSI) to the old VLR.
    c) The old VLR acknowledges with Cancel Location Ack (IMSI).
    d) The HLR sends Insert Subscriber Data (IMSI, GSM subscriber data) to the new VLR.
    e) The new VLR acknowledges with Insert Subscriber Data Ack (IMSI).
    f) The HLR responds with Update Location Ack (IMSI) to the new VLR.
12) The new VLR allocates a new TMSI and responds with Location Update Accept (VLR TMSI) to the SGSN. VLR TMSI is optional if the VLR has not changed.
13) The new SGSN validates the MS's presence in the new RA. If due to roaming restrictions the MS is not allowed to be attached in the SGSN, or if subscription checking fails, then the SGSN rejects the routing area update with an appropriate cause. If all checks are successful then the new SGSN establishes MM context for the MS. The new SGSN responds to the MS with Routing Area Update Accept (P-TMSI, VLR TMSI, P-TMSI Signature, new CN identifier).
14) The MS confirms the reallocation of the TMSIs by returning a Routing Area Update Complete message to the SGSN.
15) The new SGSN sends a TMSI Reallocation Complete message to the new VLR if the VLR TMSI is confirmed by the MS.

NOTE: Steps 11, 12, and 15, are performed only if step 9 is performed.

Note: This case assumes no change on the Gs interface, and corresponds to the case where one LA is still handled by a single MSC/VLR. So SGSN derives the MSC/VLR address from LAI (current solution).

In the case where many MSC/VLRs would handle the same LA, and Gs interface is used, the solution presented above should be enhanced by adding CN identifier (eventually associated with a CN type indicating CS) to message 1 (Routing area update request) and to message 13 (Routing area update accept). In addition CN identifier should be added in Gs interface to message 10 (Location update request) and to message 12 (Location update accept). This supposes that the SGSN is capable of deriving MSC address from LAI and CN identifier, or at least from only LAI (as long as one SGSN always selects same MSC address for same LA, no unnecessary inter MSC/VLR location update is performed if SGSN do not change).

Another example of a procedure where the method to select serving node based on CN identifier may be used, is a Combined Cell/URA Update and SRNS Relocation Procedure.

This procedure is only performed for an MS in PMM-CONNECTED state, where the Iur carries control signalling but no user data.

The Combined Cell/URA Update and SRNS Relocation procedure is used to move the UTRAN to CN connection point at the UTRAN side from the source SRNC to the target RNC, while performing a cell re-selection in the UTRAN. In the procedure, the Iu links are relocated. If the target RNC is connected to the same SGSN as the source SRNC, an Intra SGSN SRNS Relocation procedure is performed. If the routing area is changed, then this procedure is followed by an Intra SGSN Routing Area Update procedure. The SGSN detects that it is an intra-SGSN routing area update by noticing that it also handles the old RA. In this case, the SGSN has the necessary information about the MS and there is no need to inform the HLR about the new MS location.

Before the Combined Cell/URA Update and SRNS Relocation and the Routing Area Update the MS is registered in the old SGSN. The source RNC is acting as serving RNC.

After the Combined Cell/URA Update and SRNS Relocation and the Routing Area Update, the MS is registered in the new SGSN The MS is in state PMM-CONNECTED towards the new SGSN, and the target RNC is acting as serving RNC.

Figure 7:
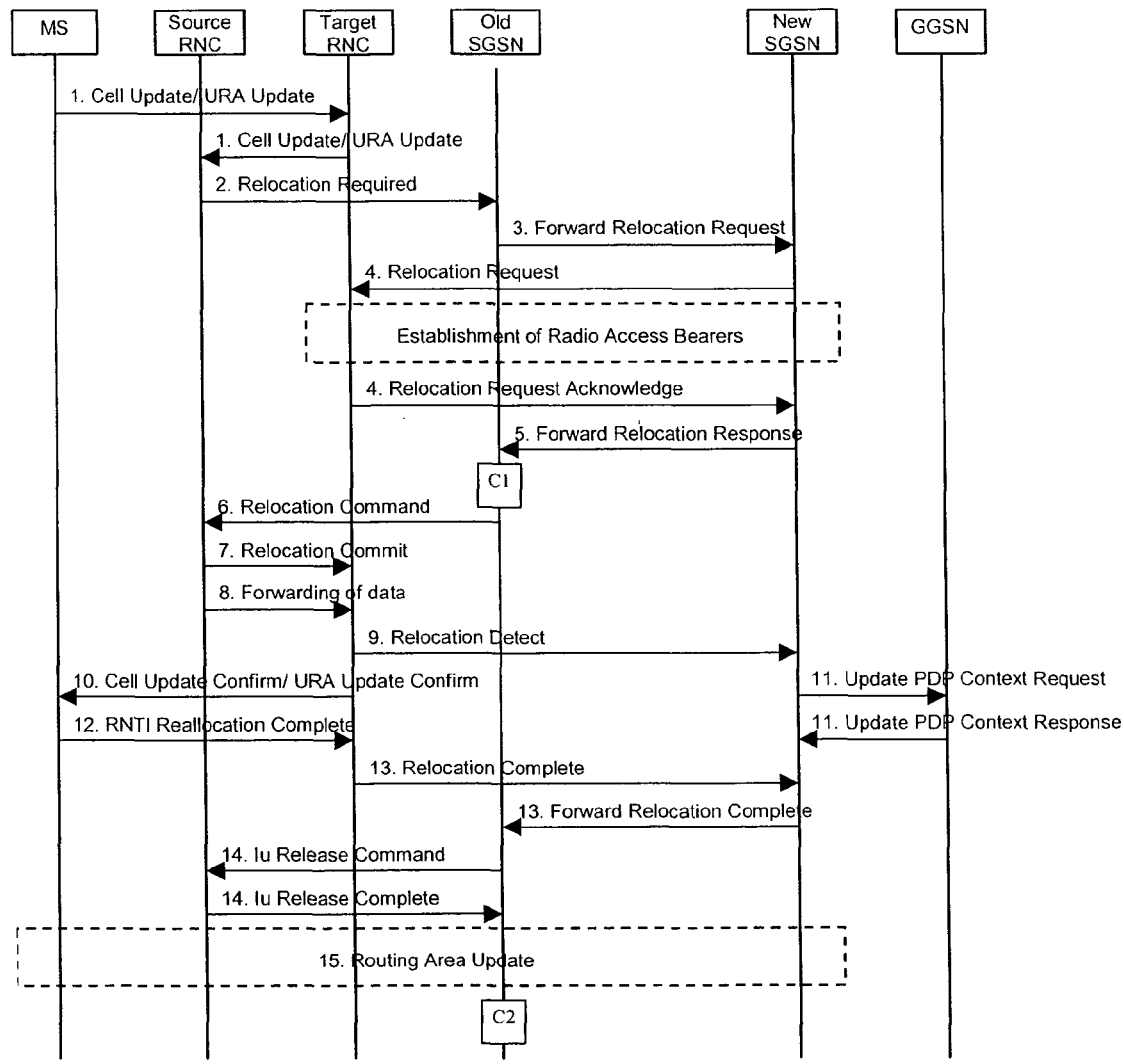
FIG. 7 shows steps performed in a Combined Cell/URA Update and SRNS Relocation Procedure according to another embodiment of the invention.

The Combined Cell/URA Update and SRNS Relocation procedure for the PS domain is illustrated in FIG. 7. The sequence is valid for both intra-SGSN SRNS relocation and inter-SGSN SRNS relocation. The steps are described by referring to the numbering shown in FIG. 7.

1) The MS sends a Cell Update/URA Update message to the UTRAN, after having made cell re-selection. Upon reception of the message, the target RNC forwards the received message towards the source SRNC via Iur. Source SRNC decides to perform a combined cell/URA update and SRNS relocation towards the target RNC.
2) The source SRNC initiates the relocation preparation procedure by sending a Relocation Required message (Relocation Type, Cause, Source ID, Target ID, Source RNC to Target RNC Transparent Container) to the old SGSN. The source SRNC shall set Relocation Type to "UE not involved". Source RNC to Target RNC Transparent Container includes the necessary information for Relocation co-ordination, security functionality, and RRC protocol context information (including UE Capabilities).
3) The old SGSN determines from Target ID if the SRNS Relocation is intra SGSN SRNS relocation or inter SGSN SRNS relocation. In case of inter SGSN SRNS relocation the old SGSN initiates the relocation resource allocation procedure by sending a Forward Relocation Request (IMSI, Tunnel Endpoint Identifier Signalling, MM Context, PDP Context, Target Identification, UTRAN Transparent Container, RANAP Cause) message to the new SGSN. The new SGSN address is derived from the target ID and the CN identifier which was previously sent to the MS. At the same time a timer is started on the MM and PDP contexts in the old SGSN, see Routing Area Update procedure in subclause "Location Management Procedures (UMTS Only)". The Forward Relocation Request message is applicable only in case of inter SGSN SRNS relocation.
4) The new SGSN sends a Relocation Request message (Permanent NAS UE Identity, Cause, CN Domain Indicator, Source RNC to Target RNC Transparent Container, RABs To Be Setup) to the target RNC. For each RAB requested to be established, RABs To Be Setup shall contain information such as RAB ID, RAB parameters, Transport Layer Address, and Iu Transport Association. The RAB ID information element contains the NSAPI value, and the RAB parameters information element gives the QoS profile. The Transport Layer Address is the SGSN Address for user data, and the Iu Transport Association corresponds to Tunnel Endpoint Identifier Data.
   After all necessary resources for accepted RABs including the Iu user plane are successfully allocated, target RNC shall send the Relocation Request Acknowledge (RABs setup, RABs failed to setup) message to the new SGSN. Target RNC will for each RAB to be setup (defined by an IP Address and a Tunnel Endpoint Identifier) receive both forwarded downstream PDUs from the source SRNC as well as downstream PDUs from the new SGSN.
5) When resources for the transmission of user data between target RNC and new SGSN has been allocated and the new SGSN is ready for relocation of SRNS, the Forward Relocation Response message (Cause, RANAP Cause, and Target RNC Information) is sent from new SGSN to old SGSN. This message indicates that the new SGSN and target RNC are ready to receive from source SRNC the downstream packets not yet acknowledged by MS, i.e., the relocation resource allocation procedure is terminated successfully. RANAP Cause is information from the target RNC to be forwarded to the source RNC. The Target RNC Information, one information element for each RAB to be setup, contains the RNC Tunnel Endpoint Identifier and RNC IP address for data forwarding from source SRNC to target RNC. The Forward Relocation Response message is applicable only in case of inter SGSN SRNS relocation.
6) The old SGSN continues the relocation of SRNS by sending a Relocation Command (RABs to be released, and RABs subject to data forwarding) message to the source SRNC. The old SGSN decides the RABs subject to data forwarding based on QoS, and those RABs shall be contained in RABs subject to data forwarding. For each RAB subject to data forwarding, the information element shall contain RAB ID, Transport Layer Address, and Iu Transport Association. The Transport Layer Address and Iu Transport Association is used for forwarding of DL N-PDU from source RNC to target RNC.
7) Upon reception of the Relocation Command message from the PS domain, the source RNC shall start the data-forwarding timer. When the relocation preparation procedure is terminated successfully and when the source SRNC is ready, the source SRNC shall trigger the execution of relocation of SRNS by sending a Relocation Commit (SRNS Contexts) message to the target RNC. The purpose of this procedure is to transfer SRNS contexts from the source RNC to the target RNC. SRNS contexts are sent for each concerned RAB and contain the sequence numbers of the GTP-PDUs next to be transmitted in the uplink and downlink directions and the next PDCP sequence numbers that would have been used to send and receive data from the MS. For connections using RLC unacknowledged mode PDCP sequence numbers is not used.
8) After having sent the Relocation Commit message, source SRNC begins the forwarding of data for the RABs subject to data forwarding. The data forwarding at SRNS relocation shall be carried out through the Iu interface, meaning that the data exchanged between source SRNC and target RNC are duplicated in the source SRNC and routed at IP layer towards the target RNC.
9) The target RNC shall send a Relocation Detect message to the new SGSN when the relocation execution trigger is received. For SRNS relocation type "UE not involved", the relocation execution trigger is the reception of the Relocation Commit message from the Iur interface. When Relocation Detect message is sent, target RNC shall start SRNC operation.
10) After having sent the Relocation Detect message, target SRNC responds to the MS by sending a Cell Update Confirm/URA Update Confirm message. Both messages contain UE information elements and CN information elements. The UE information elements include among others new SRNC identity and S-RNTI. The CN information elements contain among others Location Area Identification and Routing Area Identification. The procedure shall be coordinated in all Iu signalling connections existing for the MS.
11) Upon reception of Relocation Detect message, CN may switch the user plane from source RNC to target SRNC. If the SRNS Relocation is an inter SGSN SRNS relocation, the new SGSN sends Update PDP Context Request messages (new SGSN Address, SGSN Tunnel Endpoint Identifier, QoS Negotiated) to the GGSNs concerned. The GGSNs update their PDP context fields and return an Update PDP Context Response (GGSN Tunnel Endpoint Identifier) message.

12) When the MS has reconfigured itself, it sends the RNTI Reallocation Complete message to the target SRNC.
13) When target SRNC receives the RNTI Reallocation Complete message, i.e. the new SRNC-ID+S-RNTI are successfully exchanged with the UE by the radio protocols, target SRNC shall initiate the Relocation Complete procedure by sending the Relocation Complete message to new SGSN. The purpose of Relocation Complete procedure is to indicate by the target SRNC the completion of relocation of SRNS to the CN. If the user plane has not been switched at Relocation Detect, the CN shall upon reception of Relocation Complete switch the user plane from source RNC to target SRNC, If the SRNS Relocation is an inter SGSN SRNS relocation, the new SGSN signals to the old SGSN the completion of the SRNS relocation procedure by sending a Forward Relocation Complete message.
14) Upon receiving the Relocation Complete message or if it is an inter SGSN SRNS relocation; the Forward Relocation Complete message, the old SGSN sends an Iu Release Command message to the source RNC. When the RNC data-forwarding timer has expired the source RNC responds with an Iu Release Complete.
15) After the MS has finished the Cell/URA update and RNTI reallocation procedure and if the new Routing Area Identification is different from the old one, the MS initiates the Routing Area Update procedure. See subclause "Location Management Procedures (UMTS Only)". Note that it is only a subset of the RA update procedure that is performed, since the MS is in PMM-CONNECTED state.

When the RAU procedure is performed, the MS indicates the same CN identifier as used by old SGSN to find the new SGSN, so that the SGSN that is selected by the new SRNC, is the same as the one that has already been selected by the old SGSN.

An alternative solution is that the old SGSN selects anyone of the SGSN capable to connect to the target RNC based on target ID. Then the new SGSN sends its CN identifier to the MS, e.g. by adding CN identifier in message 4 (Relocation Request) and 10 (Cell Update Confirm/URA Update Confirm message). Then the MS uses the CN id for the update selecting the right SGSN.

In a preferred implementation, the coding of the CN identifier is optimized to allow enough serving nodes to handle the same area, but not to increase too much radio signaling. The preferred coding is therefore to use 4 bits, providing 16 serving nodes but not much overhead.

Also to simplify implementation, a given code (e.g. 0000) should indicate the default serving node for all areas. And another code (e.g. 0001) should indicate the secondary default serving node. This implementation reduces need to configure an additional parameter as a default. In addition, when a node (e.g. RNC) selects the default, it can be implemented as using known default value of CN identifier (e.g. 0000) to query the list and retrieve (default) serving node address.

Concerning Gs interface and a simultaneous PS/CS attachment, if an association between the SGSN and the MSC is created (e.g. the UE (user equipment) performs a combined PS/CS attach), the SGSN is provided with, or has access to, a translation table to derive the MSC address from the RAI. Changes are needed to the translation table if multiple MSCs may control the same location area. An additional identifier, the MSC Identifier, may be provided to find a specific MSC controlling a location area.

Figure 8:
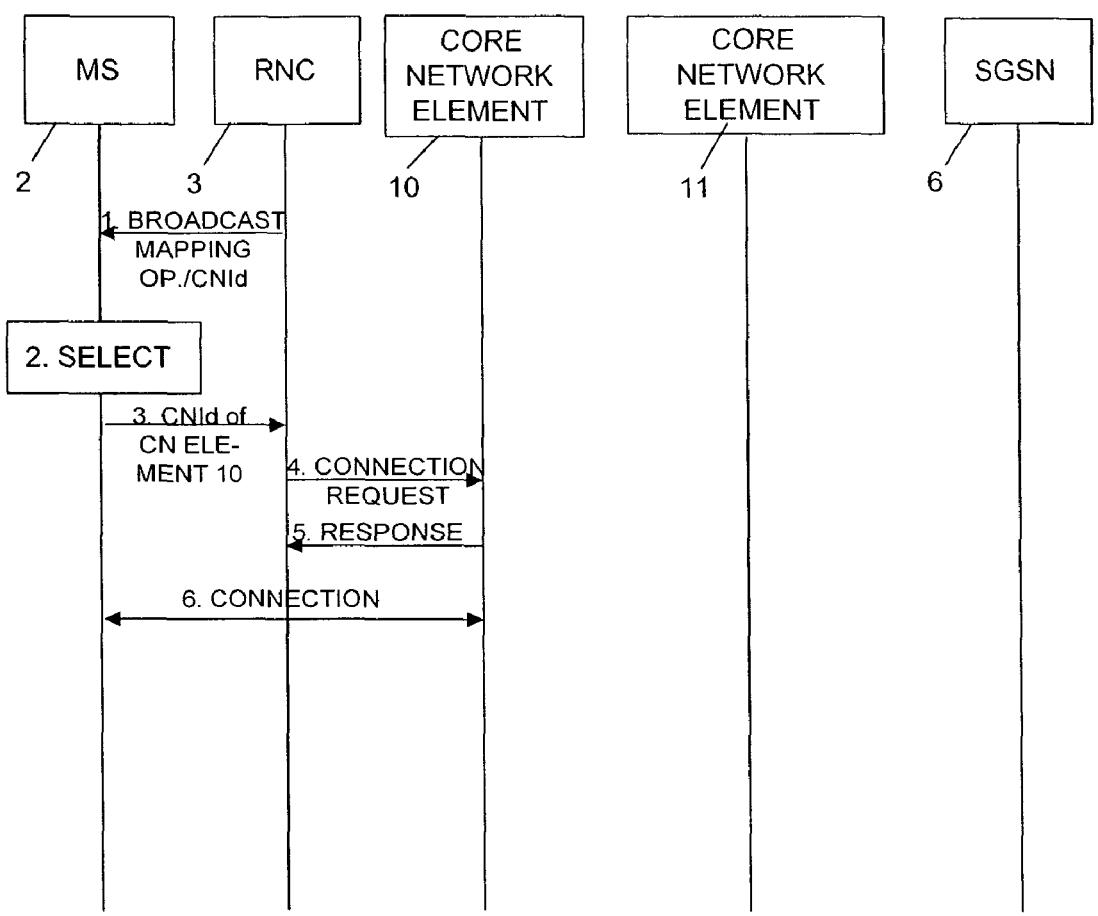
FIG. 8 illustrates a message flow in a system and method according to a further embodiment of the invention.

FIG. 8 illustrates a message flow in a system and method according to a further embodiment of the invention. This embodiment relates to a MVNO (Mobile Virtual Network Operator) having at least one own core network (CN) element 6, 10, 11 such as an MSC/VLR (Mobile Switching Center/Visitor Location Register) and/or SGSN 6.

This embodiment is preferably, but not exclusively targeted to GPRS, and future UMTS systems, especially in a case where multiple CN elements such as SGSN/MSC can be connected to the same RNC. In this embodiment the different CN elements can belong to different operators. The MS 2 may preferably store the CN Ids (Identifiers) on the SIM inserted or insertable in the MS 2.

Figure 9:
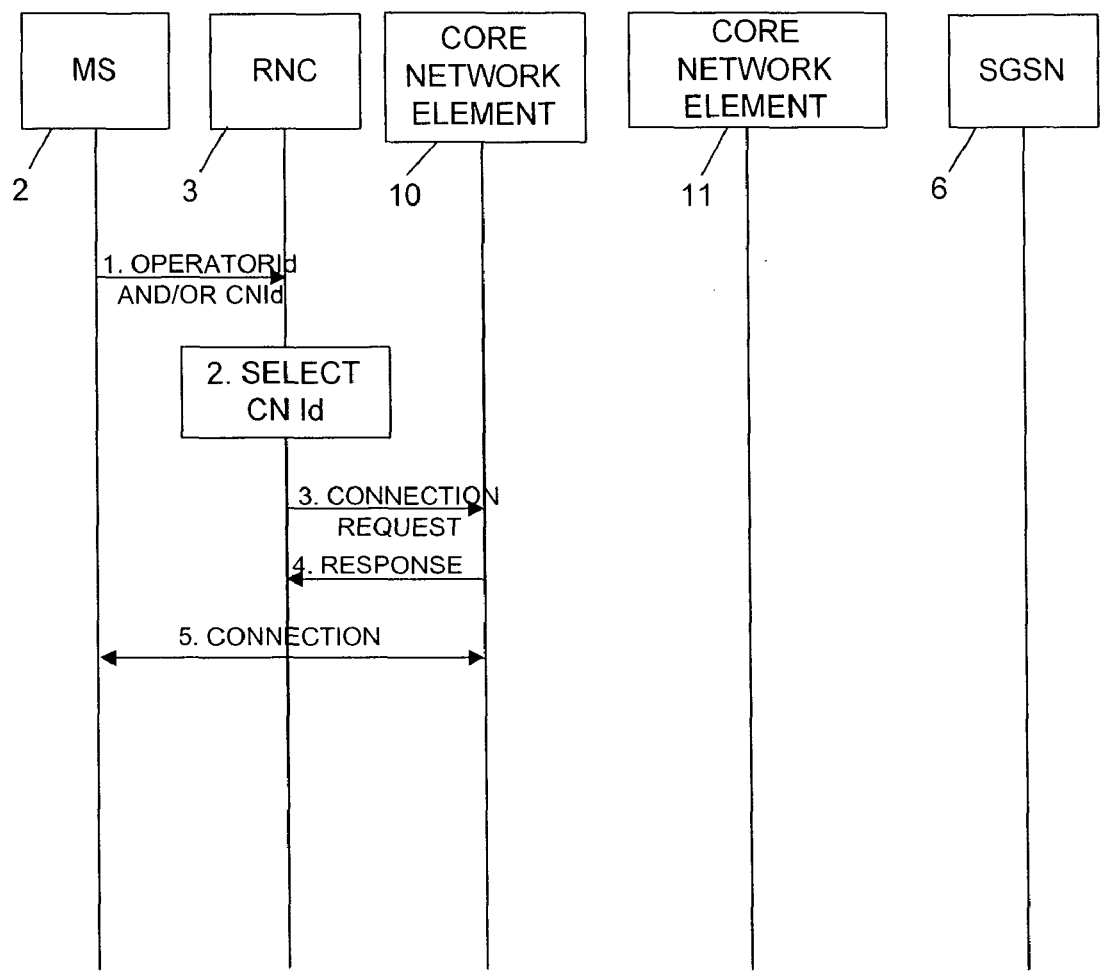
FIG. 9 shows a message flow in a system and method according to another embodiment of the invention.

The embodiments of FIGS. 8 and 9 include the feature of using an operator ID to select a CN node belonging to the right MVNO operator when connecting to the network. Two methods are presented: (1) operator Id is broadcast to the MS 2 and MS 2 makes the decisioning; (2) operator Id is sent from MS 2 to RNC 3 and RNC 3 selects the CN Id. The embodiment according to FIG. 8 is directed to the first method whereas FIG. 9 embodiment implements the second method. With both methods, one MVNO operator may have more than one node such as SGSN covering the same area.

The first method shown in FIG. 8 includes step 1. of broadcasting information to the MS 2 indicating the mapping between a certain MVNO operator and the CN ID used in this area. The MS 2 then performs a selection step 2 for selecting it favorite operator (i.e. MVNO) in accordance with stored internal selection criteria. The corresponding CN Id (as received in step 1. or as stored inside MS 2) of the selected operator is inserted as part of the RRC connect request message 3. sent to RNC 3. As described above with regard to the preceding embodiments, the RNC 3 then establishes the connection with the corresponding CN element 6, 10, or 11 identified by the transmitted CN Id, as shown by steps 4. to 6.

Preferably, the CN Id of the MSC/VLR and SGSN of the same operator is the same to limit the amount of information broadcast.

In addition the availability of SGSN and/or MSC/VLR for this MVNO may be indicated in the broadcast message of step 1.

In a preferred implementation of this embodiment, only part of CN Id is broadcast in step 1. (e.g. 2 first bits) while the other necessary bits, e.g. the last two bits are selected arbitrarily by MS 2. This allows MNVO to have multiple CN elements per RAN.

The information broadcasted may for example be:

CN Id11<->03343 (mnc033 mcc43)

CN Id10<->03340 (mnc033 mcc40)

CN Id01<->03345 (mnc033 mcc45)

(mnc, Mobile Network Code; mcc, Mobile Country Code)

If the MS 2 has no preference (or does not support the feature), it does not send CN Id in step 3 and is then preferably connected to a default CN element.

In a preferred embodiment, global operators have a global operator ID. One practical way is to allocate the global operator IDs from the range of an unused country code, e.g.:

99901=Orange

99902=Vodafone

99903=Virgin

Note that the same teaching is applicable to GPRS, where the CN Id is sent to BSC preferably as part of Random TLLI (no change to radio protocols needed).

An alternative implementation is to avoid broadcasting any parameter, but letting the MS 2 send in first RRC message (together or instead of CN Id) the operator identifier. This alternative is implemented in the embodiment according to FIG. 9. The operator identifier is preferably mnc/mcc (easier as it is on SIM) but may also be a global operator ID (see above) or other type of identifier.

FIG. 9 shows a message flow in a system and method according to this embodiment of the invention. This embodiment likewise relates to a MVNO (Mobile Virtual Network Operator) having at least one own core network element 6, 10, 11 such as an MSC/VLR (Mobile Switching Center/Visitor Location Register) and/or SGSN 6.

A preferred implementation of this alternative is that an MS 2 not having stored a CN Id, adds its operator identifier in the Connection request message 1. when the MS 2 makes the first RRC connection. The RNC 3 has means (e.g. access to a configurable database) to check whether one of the available CN Ids corresponds to this operator identifier. This check or selection is represented by step 2. If one of the available CN Ids corresponds to the operator identifier sent from MS 2, this CN Id is selected and the connection is established to the CN node 6, 10, or 11 corresponding to the selected CN Id. The CN node will indicate in MM signaling the selected CN identifier (CN Id) to the MS 2. The connection is established in a known manner according to steps 3. to 5. of FIG. 9.

In an alternative implementation, the MVNO uses the same CN identifier across the complete host PLMN (i.e. MVNO use same CN identifier across the different LAs (or RAs)). This means that when the MS moves from one CN area to another, the same CN identifier corresponds to a node of same MVNO in the new CN area. Note that a CN area is the full area reachable from one CN node, and is composed of one or many Location Area LA (or Routing Area RA). In a small network it may cover the whole country. Also a small MVNO may have one CN node for the full country, while another MVNO may have many CN nodes.

In this case, the MS subsequent to RRC connection establishment messages sends only CN Id and not operator identifier, as long as it is in same PLMN.

If the MS performs a PLMN reselection, then it preferably sends both CN Id and operator identifier in the first RRC connection establishment message. The new RNC then uses the operator identifier to select the new CN Id. CN Id may be used based on the configuration and is useful in the case where a MVNO has an agreement with a transnational operator (the same CN node may cover more than one country/PLMN).

In another case, the MVNO may use different CN identifiers across the different LAs (or RAs) (but inside one LA (or RA) CN identifier is unique). This means that when the MS moves from one LA (or RA) to another, a different CN may be used by the same MVNO in the new LA (or RA).

In this case, the MS in subsequent RRC connection establishment messages sends only CN Id and not operator identifier, as long as it is in same LA (or RA).

If the MS changes LA (or RA), then it preferably sends both CN Id and operator identifier in the first RRC connection establishment message. The new RNC can then use the operator identifier to select the new CN Id. Here again, CN Id may be used based on configuration and is useful in a case where a MVNO has an agreement with a transnational operator (the same CN node may cover more than one country/PLMN, and/or the MVNO may have two or more CN nodes per area).

Note that the same principle can be applied to with GPRS radio, but it requires to modify the TBF (Temporary Block Flow) request, as the operator identifier is unlikely to fit in TLLI coding space.

When the MVNO has more than one node per area, the following implementation is preferred:

The RNC includes, or have access to, a list of CN Ids corresponding to one operator identifier. If only operator identifier is sent to the RNC 3 from the MS 2, RNC 3 may select any of these nodes (e.g. based on availability, proximity, load sharing . . . ). If operator identifier and CN Id is sent from the MS 2, then the RNC 3 preferably selects the same CN Id if part of the list.

If an operator Id not belonging to the list is sent, a default CN Id is selected.

Operator Id: --->CN Id 99901 (=Orange)--->1; 2; 3 (in order of preference)

99902 (=Vodafone)--->11; 12; 13; 14 (Use Round-Robin)

99903 (=Virgin) --->7; 8 (in order of preference)

Default (host may be Voda)--->11; 12; 13; 14 (Use Round-Robin).

The invention according to the embodiments of FIGS. 8, 9 overcomes the problem of modifying the SIM card. Many operators prefer to keep the same SIM card to avoid the cost of changing old SIM card.

In addition, broadcasting information over the radio or sending operator ID (e.g. read on SIM) from MS 2 is more flexible. Different CN Ids may be used in different regions. For example if Orange is MVNO all over Europe, the SIM does not need to know which CN Id is used in which country.

The invention according to FIGS. 8, 9 covers the field of MNVO. It takes advantage of the feature of multiple CNs per radio network and provides a solution therefor.

Although preferred embodiments have been described above, the invention is not limited thereto and may also be implemented in networks of different types using serving nodes of different structure such as MSC/VLR.

Also the claims should be taken in their broad meaning, so that target ID which identifies an element handling an area, can in fact be considered as the identifier of an area, i.e. the area handled by this element.

The invention claimed is:

1. A system, comprising:

a radio network controller; and at least one alternatively selectable core network element, wherein the system is configured to establish a connection via the radio network controller and the at least one core network element, wherein at least one of network elements is configured to store a list of core network elements selectable by the radio network controller, the core network elements stored on the list serving a plurality of different routing areas, wherein each of the core network elements stored on the list serves one of the plurality of different routing areas, wherein the at least one of the core network elements is configured to maintain state information about at least one user equipment, wherein at least two core network elements of a same type are assigned to a same area identifier, wherein the radio network controller is configured to select a core network element from a sub-list of core network elements of the core network elements stored on the list to connect to the at least one user equipment, the core network elements in the sub-list serving a particular routing area where the user equipment is currently located, the particular routing area being associated with a corresponding area identifier, the core network elements in the sub-list of core network elements selected based on one or more of: the area identifier associated with the particular routing area where the user equipment is located and a core network element identifier, and wherein the radio network controller is further configured to receive, from the at least one user equipment, a connection initiating message for establishing a connection, the connection initiating message comprising an added core network element identifier, the radio network controller being configured to check the core network element identifier added to the connection initiating message, and further configured to send a connection request to the selected core network element.

2. The system according to claim 1, wherein the list is defined by the area identifier.

3. The system according to claim 2, wherein the area identifier is a location or routing area identity (LAI or RAI) or target identity.

4. The system according to claim 1, wherein a radio access network is configured to broadcast the list to the at least one user equipment which is configured to select an identifier from the list and is configured to send the selected identifier to the radio access network.

5. The system according to claim 1, wherein the at least one network element which is configured to store the list is a domain name system server.

6. The system according to claim 1, wherein one of the at least one core network element is set as a default core network element to be used for handling the connection when no other one of the at least one core network element is selected.

7. The system according to claim 1, wherein one of the at least one core network element is set as a master core network element to be used for handling the connection or transmitting information to another one of the at least one core network element when the another core network element is selected for handling the connection.

8. A method, comprising:
receiving, at a radio network controller, a connection initiating message from user equipment for establishing a connection, the connection initiating message comprising an identifier identifying a desired core network element, wherein the radio network controller is configured to select a core network element from a sub-list of core network elements selected from core network elements stored on a list to connect to the user equipment, the core network elements in the sub-list serving a particular routing area where the user equipment is currently located, the core network elements in the sub-list selected based on one or more of: an area identifier associated with the particular routing area where the user equipment is located and the received identifier identifying the desired core network element;
checking, at the radio network controller, the core network identifier comprised in the connection initiating message;
selecting a core network element based on the received identifier;
sending, by the radio network controller, a connection request to the selected core network element; and
establishing a connection via said selected core network element;

wherein the core network elements stored on the list serve a plurality of different routing areas, wherein each of the core network elements stored on the list serves one of the plurality of different routing areas.

9. The method according to claim 8, wherein the radio network controller receives a list of core network elements selectable by the radio network controller.

10. The method according to claim 9, wherein the list is defined by area identifier.

11. The method according to claim 9, wherein a core network element is excluded from the list before starting an operation at least temporarily or partly blocking future connection handling capability of that core network element.

12. The method according to claim 8, wherein the area identifier is a location or routing area identity (LAI or RAI) or target identity.

13. The method according to claim 8, wherein the connection is maintained in the same selected core network element when the at least one user equipment is moving inside a core network area.

14. The method according to claim 8, wherein a radio access network or the radio network controller broadcasts the list to the at least one user equipment, the radio access network or radio network controller receiving an identifier selected from the list.

15. The method according to claim 8, wherein the radio network controller receives information on at least two core network elements assigned to a transmitted area identifier from a network element storing a list of core network elements selectable by the radio network controller.

16. The method according to claim 8, wherein the list of selectable core network elements is received by the radio network controller in a defined order.

17. The method according to claim 16, wherein the order is dependent upon a load of the core network elements indicated in the list.

18. The method according to claim 16, wherein the order is dependent upon an address of the radio network controller.

19. The method according to claim 16, wherein the order is dependent upon a geographical distance between the radio network controller and the at least one core network element.

20. The method according to claim 8, wherein the at least one core network element belongs to a packet-switched network.

21. The method according to claim 8, wherein the radio network controller provides radio access to at least one user equipment.

22. The method according to claim 8, wherein the at least one core network element is a serving node.

23. The method according to claim 8, wherein a list of alternatively selectable core network elements is received from a domain name system server.

24. The method according to claim 23, wherein the radio network controller receives, from the domain name system server, a list of internet protocol addresses of core network elements, or a list of internet protocol addresses of core network elements together with their names.

25. The method according to claim 8, wherein the radio network controller detects the identifier from a message received from a third connection originating or terminating network element, or deduces the identifier from other information related to a third network element.

26. The method according to claim 8, wherein the identifier is received by the radio network controller as part of a message received from a third connection originating or terminating network element or one of the core network elements.

27. The method according to claim 8, wherein one of the at least one core network element is set as a default core network element to be used for handling the connection when no other one of the at least one core network element is selected.

28. The method according to claim 8, wherein one of the at least one core network element is set as a master core network element to be used for handling the connection or transmitting information to another one of the at least one core network element when the another core network element is selected for handling the connection.

29. The method according to claim 28, wherein the information to be transmitted to the another core network element is context information.

30. An apparatus, comprising:
a storage configured to store an operator identifier and/or a core network element identifier;
an inserter configured to insert the core network identifier to an connection initiating message for establish an connection; and
a transmitter configured to send said connection initiating message comprising the core network element identifier to a radio network controller, the radio network controller is configured to select a core network element from a sub-list of core network elements selected from core network elements stored on a list to connect to the apparatus, the core network elements in the sub-list serving a particular routing area where the user equipment is currently located, the core network elements in the sub-list selected based on one or more of: an area identifier associated with the particular routing area where the user equipment is located and the core network element identifier;
wherein the core network elements stored on the list serve a plurality of different routing areas, wherein each of the core network elements stored on the list serves one of the plurality of different routing areas.

31. The apparatus according to claim 30, wherein the core network element identifier is a latest core network element identifier received from a network.

32. The apparatus according to claim 30, wherein the core network element identifier is a preconfigured core network element identifier, which is always sent from the apparatus in radio signaling.

33. The apparatus according to claim 30, wherein the operator identifier or core network element identifier is stored on a subscriber identity module card of the apparatus.

34. The apparatus according to claim 30, wherein the apparatus is a mobile station.

35. An apparatus, comprising:
a receiver configured to receive a connection initiating message, comprising a core network element identifier, for establishing a connection, from a user equipment;
a selector configured to check the core network identifier added to the connection initiating message and select a serving core network element for handling the connection from a sub-list of core network elements selected from a list of serving network elements, the core network elements in the sub-list serving a particular routing area where the user equipment is currently located, the core network elements in the sub-list selected based on one or more of: an area identifier associated with the particular routing area where the user equipment is located and the core network element identifier; and
a transmitter configured to send an connection request to the selected core network element;
wherein the serving network elements stored on the list serve a plurality of different routing areas, wherein each of the core network elements stored on the list serves one of the plurality of different routing areas.

36. The apparatus according to claim 35, implemented as a radio network controller.

37. The apparatus according to claim 35, implemented as a base station controller.

38. An apparatus, comprising:
a selector configured to select from a sub-list of core network elements selected from a list of serving network elements a previous serving network element, the core network elements in the sub-list serving a particular routing area where a user equipment is currently located, the core network elements in the sub-list selected using an area identifier associated with the particular routing area where the user equipment is located and a target identifier received from a user equipment; and
a requestor configured to request connection information from a previous serving network element when taking over handling of a connection which is or was previously handled by the previous serving network element;
the serving network elements stored on the list serve a plurality of different routing areas, wherein each of the core network elements stored on the list serves one of the plurality of different routing areas.

39. An apparatus, comprising:
means for receiving a connection initiating message for establishing a connection from a user equipment, the connection initiating message comprising a core network element identifier;
means for checking the core network element identifier added to the connection initiating message;
means for selecting a serving core network element for handling the connection from a sub-list of core network elements selected from a list of serving network elements, the core network elements in the sub-list serving a particular routing area where the user equipment is currently located, the core network elements in the sub-list selected based on one or more of: an area identifier associated with the particular routing area where the user equipment is located and the core network element identifier; and
means for sending a connection request to the selected serving core network element;
wherein the serving network elements stored on the list serve a plurality of different routing areas, wherein each of the core network elements stored on the list serves one of the plurality of different routing areas.

40. The apparatus according to claim 39, implemented as a radio network controller or base station controller.

41. A method, comprising:
storing an operator identifier and/or a core network element identifier;
inserting the core network element identifier to a connection initiating message for establishing a connection; and
sending said connection initiating message comprising the core network element identifier to a radio network controller, the radio network controller configured to select a core network element from a sub-list of core network elements selected from core network elements stored on a list to connect to a user equipment, the core network elements in the sub-list serving a particular routing area where the user equipment is currently located, the core network elements in the sub-list selected based on one or more of: an area identifier associated with the particular routing area where the user equipment is located and the core network element identifier;

wherein the core network elements stored on the list serve a plurality of different routing areas, wherein each of the core network elements stored on the list serves one of the plurality of different routing areas.

42. The method according to claim 41, wherein the operator identifier or core network element identifier is stored on a subscriber identity module card.

43. The method according to claim 41, being implementable in a mobile station.

44. A computer program, embodied on a computer-readable medium, configured to control a processor to implement a method, the method comprising:

receiving, at a radio network controller, a connection initiating message from user equipment for establishing a connection, the connection initiating message comprising an identifier identifying a desired core network element, wherein the radio network controller is configured to select a core network element from core network elements a sub-list of core network elements selected from stored on a list to connect to the user equipment, the core network elements in the sub-list serving a particular routing area where the user equipment is currently located, the core network elements in the sub-list selected based on one or more of: an area identifier associated with the particular routing area where the user equipment is located and the received identifier identifying the desired core network element;

checking, at the radio network controller, the core network identifier comprised in the connection initiating message;

selecting a core network element based on the received identifier; sending, by the radio network controller, a connection request to the selected core network element; and establishing a connection via said selected core network element;

wherein the core network elements stored on the list serve a plurality of different routing areas, wherein each of the core network elements stored on the list serves one of the plurality of different routing areas.

45. A computer program, embodied on a computer-readable medium, configured to control a processor to implement a method, the method comprising:

storing an operator identifier and/or a core network element identifier;

inserting the core network element identifier to a connection initiating message for establishing a connection; and sending said connection initiating message comprising the core network element identifier to a radio network controller, the radio network controller configured to select a core network element from a sub-list of core network elements selected from core network elements stored on a list to connect to a user equipment, the core network elements in the sub-list serving a particular routing area where the user equipment is currently located, the core network elements in the sub-list selected based on one or more of: an area identifier associated with the particular routing area where the user equipment is located and the core network element identifier;

wherein the core network elements stored on the list serve a plurality of different routing areas, wherein each of the core network elements stored on the list serves one of the plurality of different routing areas.

* * * * *